US011574007B2

(12) United States Patent
Roy et al.

(10) Patent No.: US 11,574,007 B2
(45) Date of Patent: Feb. 7, 2023

(54) DEVICE, SYSTEM AND METHOD FOR GENERATING AN ACCOMPANIMENT OF INPUT MUSIC DATA

(71) Applicant: SONY CORPORATION, Tokyo (JP)

(72) Inventors: Pierre Roy, Paris (FR); Francois Pachet, Paris (FR)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/730,366

(22) Filed: Oct. 11, 2017

(65) Prior Publication Data

US 2018/0046709 A1 Feb. 15, 2018

Related U.S. Application Data

(63) Continuation of application No. 14/401,311, filed as application No. PCT/EP2013/061372 on Jun. 3, 2013, now Pat. No. 9,798,805.

(30) Foreign Application Priority Data

Jun. 4, 2012 (EP) .................................... 12170706
Nov. 28, 2012 (EP) .................................... 12194679

(51) Int. Cl.
*G06F 16/00* (2019.01)
*G06F 16/683* (2019.01)
*G10H 1/36* (2006.01)

(52) U.S. Cl.
CPC .......... *G06F 16/683* (2019.01); *G10H 1/361* (2013.01); *G10H 2210/021* (2013.01);
(Continued)

(58) Field of Classification Search
CPC . G06F 17/30743; G06F 16/683; G10H 1/361; G10H 2210/021; G10H 2210/031; G10H 2210/141; G10H 2240/131
See application file for complete search history.

(56) References Cited

U.S. PATENT DOCUMENTS

| 5,003,860 A | 4/1991 | Minamitaka |
| 5,095,940 A | 3/1992 | Saur et al. |

(Continued)

FOREIGN PATENT DOCUMENTS

| JP | H1039863 A | * | 2/1998 |
| KR | 100765803 B1 | * | 10/2007 |

(Continued)

OTHER PUBLICATIONS

Muller et al., Signal Processing for Music Analysis. IEEE Journal of Selected Topics in Signal Processing, vol. 0, No. 0, 2011 (Year: 2011).*

(Continued)

*Primary Examiner* — Syed H Hasan
(74) *Attorney, Agent, or Firm* — Xsensus LLP

(57) ABSTRACT

A device for automatically generating a real time accompaniment of input music data includes a music input that receives music data. A music analyzer analyzes received music data to obtain a music data description including one or more characteristics of the analyzed music data. A query generator generates a query to a music database including music patterns and associated metadata including one or more characteristics of the music patterns, the query being generated from the music data description and from an accompaniment description describing preferences of the real time accompaniment and/or music rules describing general rules of music. A query interface queries the music database using a generated query and receives a music pattern selected from the music database by use of the query. A music output outputs the received music pattern.

17 Claims, 3 Drawing Sheets

(52) U.S. Cl.
CPC . *G10H 2210/031* (2013.01); *G10H 2210/141* (2013.01); *G10H 2240/131* (2013.01)

(56) References Cited

U.S. PATENT DOCUMENTS

| | | | |
|---|---|---|---|
| 5,218,153 A | | 6/1993 | Minamitaka |
| 5,451,709 A | | 9/1995 | Minamitaka |
| 5,510,572 A | | 4/1996 | Hayashi et al. |
| 5,525,749 A | * | 6/1996 | Aoki ............... G10H 1/0025 84/609 |
| 5,627,335 A | * | 5/1997 | Rigopulos ............ G10H 1/00 84/635 |
| 5,796,026 A | * | 8/1998 | Tohgi ................ G10H 1/383 84/609 |
| 5,990,407 A | * | 11/1999 | Gannon ............. G10H 1/0025 84/604 |
| 6,297,439 B1 | * | 10/2001 | Browne ............... G10H 1/26 84/635 |
| 8,088,985 B1 | * | 1/2012 | Bowser ................ A63J 17/00 84/477 R |
| 8,097,801 B2 | | 1/2012 | Gannon |
| 8,907,195 B1 | * | 12/2014 | Erol .................. G10H 1/361 84/609 |
| 2002/0143413 A1 | * | 10/2002 | Fay .................... H04S 1/00 700/94 |
| 2002/0194984 A1 | | 12/2002 | Pachet |
| 2003/0023421 A1 | * | 1/2003 | Finn ................. G06F 16/68 704/1 |
| 2003/0126973 A1 | * | 7/2003 | Kung ................ G10H 1/365 84/610 |
| 2003/0126975 A1 | * | 7/2003 | Urai ................. G10H 1/0091 84/737 |
| 2004/0131192 A1 | * | 7/2004 | Metcalf ................ H04S 7/30 381/1 |
| 2004/0159213 A1 | | 8/2004 | Eruera |
| 2005/0076770 A1 | * | 4/2005 | Stone ................ G10H 1/186 84/609 |
| 2006/0065104 A1 | * | 3/2006 | Ball ................. G10H 1/0025 84/609 |
| 2006/0185504 A1 | * | 8/2006 | Kobayashi .......... G10H 1/0066 84/645 |
| 2007/0137467 A1 | * | 6/2007 | Sim .................. G10H 1/20 84/645 |
| 2007/0291958 A1 | * | 12/2007 | Jehan ................ G10H 1/0025 381/103 |
| 2008/0167739 A1 | * | 7/2008 | Lin .................. G10H 1/0066 700/94 |
| 2008/0300702 A1 | * | 12/2008 | Gomez ............... G06F 16/683 700/94 |
| 2009/0064851 A1 | | 3/2009 | Morris et al. |
| 2010/0192755 A1 | | 8/2010 | Morris et al. |
| 2011/0192271 A1 | * | 8/2011 | Georges ............. G10H 1/0025 84/609 |
| 2011/0208332 A1 | * | 8/2011 | Breidenbrucker ... G10H 1/0025 700/94 |
| 2011/0254832 A1 | | 10/2011 | Wilson et al. |
| 2012/0097014 A1 | * | 4/2012 | Matsumoto ......... G10H 1/0066 84/634 |
| 2012/0101606 A1 | * | 4/2012 | Miyajima ............ G10H 1/40 700/94 |
| 2017/0263228 A1 | * | 9/2017 | Silverstein ............ G10H 1/00 |

FOREIGN PATENT DOCUMENTS

| | | |
|---|---|---|
| WO | 02 077853 | 10/2002 |
| WO | 2009 032794 | 3/2009 |

OTHER PUBLICATIONS

Wikipedia. Transition (Music). https://web.archive.org/web/20100723100355/https://en.wikipedia.org/wiki/Transition_(music). (Year: 2010).*

Pachet, F. et al., "Automatic extraction of music descriptors from acoustic signals using EDS", Audio Engineering Society 116th Convention, Berlin, Germany, May 8-11, 2004, (Total 12 Pages), (May 2004).

http://www.band-in-a-box.com/index.php, (Feb. 2, 2012).

http://www.jodyjazz.com/tradinwiththegreats.playalong.cd.html, (Feb. 2, 2012).

http://www.ableton.com, (Feb. 2, 2012).

International Search Report dated Nov. 25, 2013 in PCT/EP13/061372 Filed Jun. 3, 2013.

Decision of Rejection issued in Chinese Application 2013800293434 dated Aug. 28, 2018.

* cited by examiner

DEVICE, SYSTEM AND METHOD FOR GENERATING AN ACCOMPANIMENT OF INPUT MUSIC DATA

CROSS-REFERENCE TO RELATED APPLICATIONS

The present application is a continuation of U.S. application Ser. No. 14/401,311, filed Nov. 14, 2014, which is based on PCT/EP2013/061372, filed Jun. 3, 2013, and claims priority to European Patent Application 12 170 706.1 filed in the European Patent Office on Jun. 4, 2012 and European Patent Application 12 194 679.2 filed in the European Patent Office on Nov. 28, 2012, the entire contents of each of which being incorporated herein by reference.

BACKGROUND

Field of the Disclosure

The present disclosure relates to a device, system and method for automatically generating a real time accompaniment of input music data. Further, the present invention relates to a device and method device for generating a music database for use in a device and method for automatically generating music. Still further, the present invention relates to a computer program, a computer readable non-transitory medium and a music database.

Description of the Related Art

Musical improvisation, especially in Jazz, is both a fascinating activity and a very frustrating one. Improvisation by a human musician requires an intimate relationship between musical thought and sensory-motor processes: the musician must listen, think, develop ideas and move his/her fingers very quickly. Speed and lack of time are crucial ingredients of improvisation; it is what makes it exciting. It is also what makes it frustrating: beginners as well as experienced improvisers are by definition limited by their technical abilities and by the morphology of the instrument.

A device and method that allow generating music as a real time continuation of an input sequence of music data through a continuation phase are disclosed in US 2002/0194984 A1. U.S. Pat. No. 8,097,801 B2 discloses a system and method for generating a composition based on a database of pre-recorded performances of existing compositions.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

SUMMARY

It is an object of the present disclosure to provide an improved device, system and method for automatically generating a real time accompaniment of input music data that enable to follow the input music data and provide a better accompaniment. It is another object of the present invention to provide an improved device and method device for generating a music database for use in a device and method for automatically generating music, in particular to provide a real time accompaniment of input music data. It is a further object of the present invention to provide a corresponding computer program for implementing said method, a corresponding computer readable non-transitory medium and a suitable music database.

According to a first aspect of the present disclosure there is provided a device for automatically generating a real time accompaniment of input music data, said device comprising:
  a music input that receives music data,
  a music analyzer that analyzes received music data to obtain a music data description comprising one or more characteristics of the analyzed music data,
  a query generator that generates a query to a music database comprising music patterns and associated metadata comprising one or more characteristics of said music patterns, said query being generated from said music data description and from an accompaniment description describing preferences of said real time accompaniment and/or music rules describing general rules of music,
  a query interface that queries said music database using a generated query and that receives a music pattern selected from said music database by use of said query, and
  a music output that outputs said received music pattern.

According to a further aspect of the present disclosure there is provided a method for automatically generating a real time accompaniment of input music data, said method comprising:
  receiving music data,
  analyzing received music data to obtain a music data description comprising one or more characteristics of the analyzed music data,
  generating a query to a music database comprising music patterns and associated metadata comprising one or more characteristics of said music patterns, said query being generated from said music data description and from an accompaniment description describing preferences of said real time accompaniment and/or music rules describing general rules of music,
  querying said music database using a generated query,
  receiving a music pattern selected from said music database by use of said query, and
  outputting said received music pattern.

According to a further aspect of the present disclosure there is provided a system for automatically generating a real time accompaniment of input music data, said system comprising:
  a device for automatically generating music as a real time accompaniment of input music data according to the present invention and
  a music database comprising music patterns and associated metadata comprising one or more characteristics of said music patterns, said music database being configured for being queried by said device by use of a query and for providing a music pattern selected from said music database by use of said query.

According to another aspect of the present disclosure there is provided a device for generating a music database for use in a device and method for automatically generating music, said device comprising:
  a music input that receives music data,
  a processing unit that segments said music data into music patterns and extracts a plurality of characteristics of a music pattern as metadata of said music pattern, said characteristics including at least chords, energy per beat and/or bar, density of notes and pitch of a music pattern,
  a music output that stores music patterns and associated metadata in a music database.

According to a further aspect of the present disclosure there is provided a method for generating a music database for use in a device and method for automatically generating music, said method comprising:

receiving music data, segmenting said music data into music patterns, extracting a plurality of characteristics of a music pattern as metadata of said music pattern, said characteristics including at least chords, energy per beat and/or bar, density of notes and pitch of a music pattern, storing music patterns and associated metadata in a music database.

According to a further aspect of the present disclosure there is provided a music database comprising:

music patterns including segments of music segmented from music data, and metadata comprising a plurality of characteristics of a music pattern, said characteristics including at least chords, energy per beat and/or bar, density of notes and pitch of a music pattern.

According to still further aspects a computer program comprising program means for causing a computer to carry out the steps of the method according to the present disclosure, when said computer program is carried out on a computer, as well as a computer readable non-transitory medium having instructions stored thereon which, when carried out on a computer, cause the computer to perform the steps of the method according to the present disclosure are provided.

Preferred embodiments of the disclosure are defined in the dependent claims. It shall be understood that the claimed systems, the claimed methods, the claimed computer program and the claimed computer readable medium have similar and/or identical preferred embodiments as the claimed devices and as defined in the dependent claims The present disclosure describes a device and method for generating an accompaniment, which may provide more flexibility and use more information for generating an accompaniment. Further, the present disclosure describes a device and method for generating a music database, which may provide for a flexible accompaniment. The generated music database may in one embodiment be used in a device and method in which a music data description of the input music data is generated and used for querying the music database to search and provide a music pattern that fits to the input music data. The music data description may comprise one or more characteristics of the analyzed (corresponding) music data and, thus, may reflect essential changes appearing in the input music data, e.g. if a musician changes the style of music, the style of playing, the key, the energy, etc. It is thus possible to generate an accompaniment that "follows" the input music data, i.e. that reacts appropriately if any such essential changes in the input music data appear.

Since the analysis of the input music data, the generation of the query and the querying of the music database are generally performed on the fly and live, e.g. while a musician is playing, accompaniments can be generated on the fly and live so that the musician can be accompanied in an appropriate and flexible way, even if the musician changes the style of music, the style of playing, the key, the energy, etc.

While the input music data is preferably obtained from live music (i.e. live audio signals) played by a musician or a group of musicians, it may also be obtained from recorded music, e.g. an audio recording of a musician, which is played back and to which an accompaniment shall be added. The music data may also be original audio signals, midi data or other preprocessed music data rather than original audio signals.

The music data description may comprise various kinds of data characterizing the analyzed music data which is used in the query used for searching music patterns in the music database. Preferably, the music data description comprises one or more of pitch, bar, key, tempo, energy, volume, type of instrument(s) and tune of analyzed music data. Known feature extraction or feature generation algorithms may be used for this purpose, such as technologies developed to extract descriptors described in the MPEG-7 standard. Additionally, generic methods such as an Extractor Discovery System (EDS) as described in Pachet, F. and Zils, A., "Automatic Extraction of Music Descriptors from Acoustic Signals", in X. Serra, editor, proceedings of ISMIR 2004, pages 353-356, Barcelona, Spain, 2004 can be used interchangeably.

In addition to the music data description an accompaniment description describing preferences of said real time accompaniment and/or music rules describing general rules of music may be used for generating the query.

The accompaniment description preferably describes one or more preferences of a group of preferences comprising a tune on which the accompaniment is based, one or more instruments used for the generated accompaniment, one or more musicians used for the generated accompaniment, a music style used for the generated accompaniment and interactions between instruments. The one or more parameters included in this accompaniment description are usually set by the user, preferably in advance or on the fly (i.e. may also be changed during the accompaniment). Alternatively or in addition an automatic setting of one or more parameters included in this accompaniment description may be provided in an embodiment.

The music rules describe one or more general rules of music of a group of rules comprising preferred transitions, non-preferred transitions, harmonies, rules related to continuity (e.g. do not jump too often from one style to another, jump only at certain metrical positions, e.g. strong beats, or first bar in a part, etc.), or rules related to the global energy level of the performance (e.g. do not exceed some energy level when the energy level of the other agents is already high; alternatively, "play louder if other agents do not play"), etc. Said music rules are generally predetermined and are to be understood as conditions that should (or must) be fulfilled by the music patterns retrieved from the music database for use in the accompaniment. The music rules may either be used in the generation of the query so that only music patterns obeying said music rules are considered and retrieved from the database. Alternatively, they may be used in a check after receiving music patterns retrieved in response to the query to select a retrieved music pattern that (best) fulfils the music rules.

Music patterns are pre-recorded (or pre-generated) pieces of music (sometimes also called "riffs") which are stored in the music database. The music patterns are preferably little pieces of music having a quite short duration, e.g. between 10 msec and several seconds, preferably between 100 msec and 5 sec (in one embodiment of a length corresponding to a certain number of bars), which are obtained from music recorded while a musician is playing. Preferably, one or more musicians are playing music, e.g. different titles of music, different interpretations, different styles, etc., preferably with different instruments, to obtain a large collection of music patterns in the music database. Alternatively, a music database may contain only a small number of music patterns, for instance corresponding to five to ten different interpretations of a single piece of music by one musician.

The music patterns stored in the database are provided with metadata describing the corresponding music patterns. Said metadata are preferably obtained in an analysis of the recorded (or generated) music. During this analysis, the music is split into the above-described short music patterns, which are then analyzed to obtain the associated metadata. The metadata preferably include one or more data of the group of metadata comprising chords, energy (e.g. of every beat or bar), density of notes, chord symbols, key signature, scales, chord extensions, relative roots, zone, average energy, style, instrument, etc. Thus, the music patterns are characterized by metadata, which may be used in the search for one or more music patterns fitting to the current query.

The present disclosure thus enables a device, system and method to automatically generate music as a real time accompaniment of input music data that enable to follow the input music data, e.g. live music played by a musician, and provide a better accompaniment than the known methods and devices.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
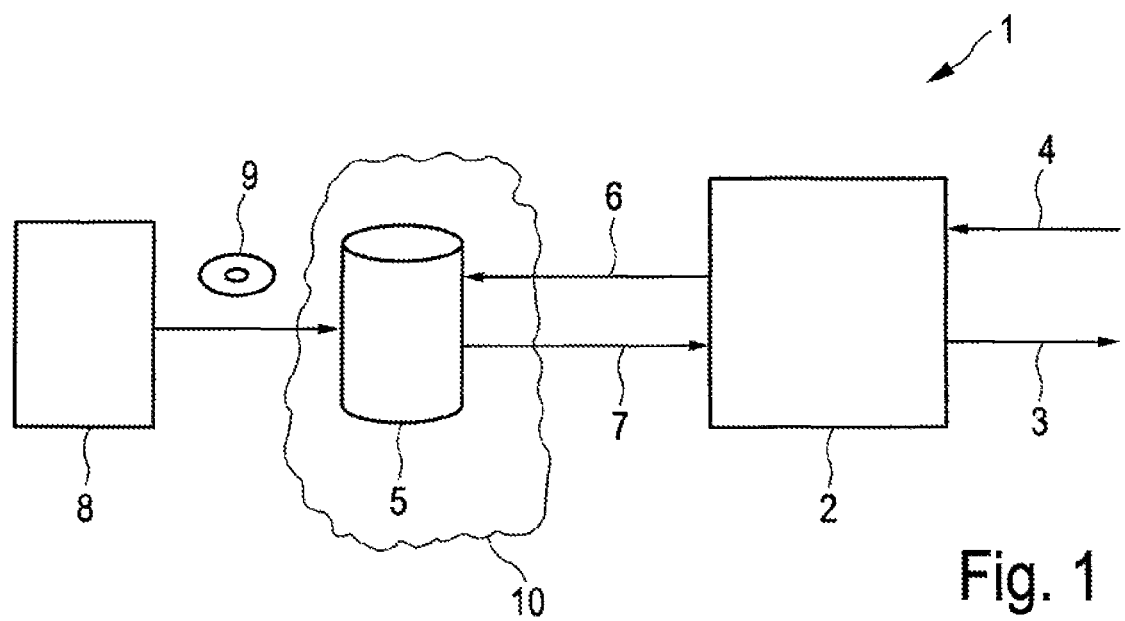
FIG. 1 shows a schematic diagram of a system and a device for automatically generating music according to the present disclosure.

Referring now to the drawings, wherein like reference numerals designate identical or corresponding parts throughout the several views, FIG. 1 shows a schematic diagram of a system and a device for automatically generating music according to the present disclosure. The system 1 comprises the device 2 for automatically generating music 3 as a real time accompaniment of input music data 4 according to the present disclosure. Further, the system 1 comprises a music database 5 according to the present disclosure comprising music patterns and associated metadata comprising one or more characteristics of said music patterns, said music database being configured for being queried by said device by use of a query 6 and for providing a music pattern 7 selected from said music database 5 by use of said query 6.

It shall be noted in this context that the music database may be organized by use of a kind of data structure, which is also used for querying the music database by using music description data. However, it is not essential that the music database comprises such a data structure for organizing the data stored therein. In particular, the music database may, in other embodiment, only include a (rather small) number of music patterns and the associated metadata. Such (small) music databases can be integrated in a larger database, e.g. a user-defined or other predetermined database in which a user already collected other (small) music databases.

The music database 5 may be generated by use of a device 8 (which is optionally, but not necessarily part of the claimed system 1) which then distributes one or more of those music databases 5, e.g. online or on record carriers 9. For instance, for each musician a different music database may be offered for sale which the user may then use to automatically generate music by which the user can be accompanied (artificially) by said musician when he/she plays music.

The input music data 4 may thus be music that is played live by a user, and the generated music 3 is music generated on the fly and automatically that live accompanies the user as a real time accompaniment of the input music data 4. In other words, the generated music 3 is generated by the claimed system 1 such that it follows the input music data 4 and, hence, the user, even if the user changes his/her style of playing music, the rhythm, cords or other music features as will be explained in the following.

The music database 5 may be stored on a record carrier, e.g. a CD, DVD or BD 9 which is read out by a corresponding drive within the device 2. Alternatively, the music database 5 may be downloaded and stored on an internal storage, e.g. a hard disk of a PC, within the device 2. In still another alternative embodiment the music database 5 may be provided within an network, e.g. within a cloud 10 or online within the Internet on a predetermined server, to which the device 2 makes online access by submitting queries 6 and receiving corresponding music patterns 7.

The device 2 for automatically generating music and/or the device for generating the music database are preferably implemented as a processing means, such as a computer or workstation on which a corresponding computer program (software) is running. In an embodiment the same processing means (e.g. the same computer) may implement both devices 2 and 8. In a more practical scenario, however, the device 2 for automatically generating music is represented by a computer or music generation system of a user (preferably a musician) whereas the device 8 for generating said music database is provided at a music company or music studio where several musicians record their music and where these music recordings are used for generating the music database 5.

In an embodiment one or more of the device 2, the music database 5 and the device 8 may be included in a cloud 10. In the embodiment depicted in FIG. 1 only the music database 5 is included in the cloud 10, i.e. the queries 6 are sent to the music database within the cloud 10 and the selected music patterns 7 are sent back from the music database 5 in the cloud 10 to the device 2. As mentioned, however, this is just an example, other examples are used in practice as well. The fact where the separate elements are stored and how they are implemented is generally not essential for the present disclosure.

In general, the concepts of "cloud computing" include the utilization of a set of shared computing resources (e.g. servers) which are typically consolidated in one or more data center locations. For example, cloud computing systems may be implemented as a web service that enables a user to launch and manage computing resources (e.g. virtual server instances) in third party data centers. In a cloud environment, computer resources may be available in different sizes and configurations so that different resource types can be specified to meet specific needs of different users. For example, one user may desire to use a small instance as a web server and another larger instance as a database server, or an even larger instance for processor intensive applications. Cloud computing offers this type of outsourced flexibility without having to manage the purchase and operation of additional hardware resources within an organization A cloud-based computing resource is thought to execute or reside somewhere in the "cloud", which may be an internal corporate network or the public Internet. From the perspective of an application developer or information technology administrator, cloud computing enables the development and deployment of applications that exhibit scalability (e.g., increase or decrease resource utilization as needed), performance (e.g., execute efficiently and fast), and reliability (e.g., never, or at least rarely, fail), all without any regard for the nature or location of the underlying infrastructure.

Figure 2:
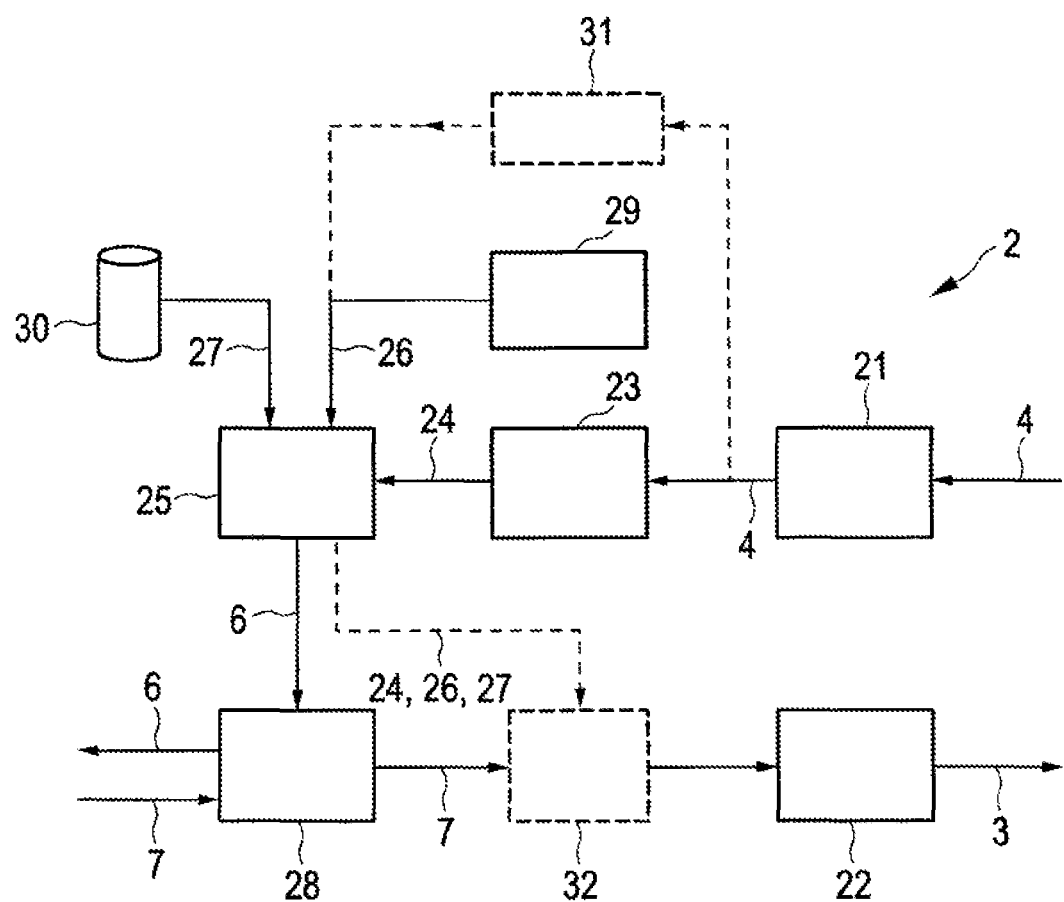
FIG. 2 shows a schematic diagram of an embodiment of a device for automatically generating music according to the present disclosure.

A schematic diagram of an embodiment of a device 2 according to the present disclosure is shown in more detail in FIG. 2. The device 2 comprises a music input 21, e.g. a microphone or an interface for coupling a microphone, for receiving music data 4 and a music output 22, e.g. a loudspeaker or an interface (e.g. an audio interface or a midi interface) for coupling a loudspeaker or a synthesizer, for outputting the generated music 3 as a real time accompaniment of the input music data 4.

The device 2 further comprises a music analyzer 23 that analyses received music data 4 to obtain a music data description 24 comprising one or more characteristics of the analyzed music data. A query generator 25 is provided that receives said music data description and generates a query 6 to the music database 5 as explained above. For generating said query 6 the query generator 25 does, however, not only use the music data description 24, but in addition uses an accompaniment description 26 describing preferences of said real time accompaniment and/or uses music rules 27 describing general rules of music.

By use of a query interface 28 the music database 5 is queried using the generated query 6 and, in response to said query, a music pattern 7 is received from said music database 5. Said music pattern 7 is then provided to the music output 22 for output as the output music pattern 3.

Figure 3:
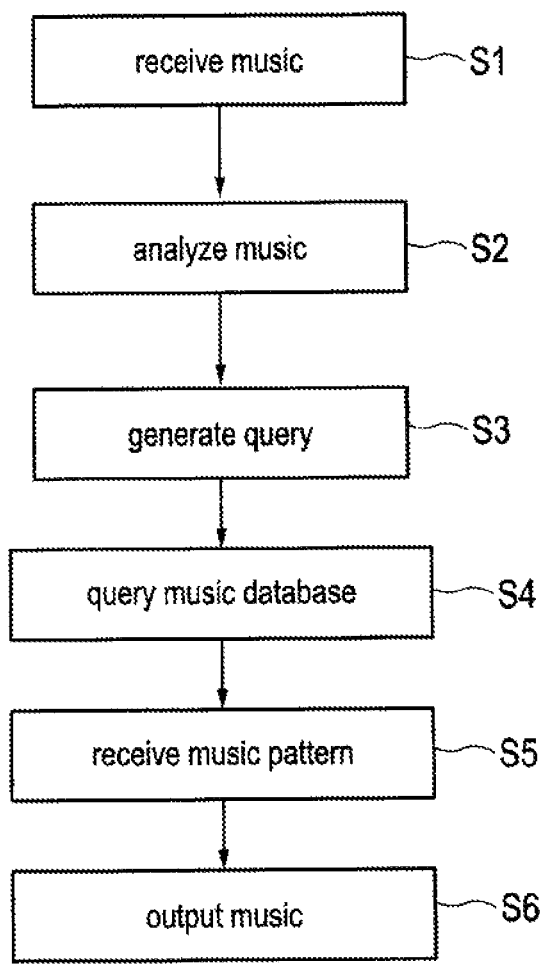
FIG. 3 shows a flow chart of a method for automatically generating music according to the present disclosure.

A flow chart of the essential steps of the proposed method for automatically generating music according to the present disclosure is shown in FIG. 3. In step S1 music data 4 is received. In step S2 the received music data 4 is analyzed to obtain a music data description 24 comprising one or more characteristics of the analyzed music data. In step S3 a query to a music database comprising music patterns and associated metadata comprising one or more characteristics of said music patterns is generated. In Step S4 the music database 5 is queried using the generated query 6. In step S5 a music pattern 7 selected from said music database 5 by use of said query 6 is received. Finally, in step S6 the received music pattern is outputted.

In a preferred embodiment the music analyzer 23 is configured to obtain a music data description comprising one or more of pitch, bar, key, tempo, distribution of energy, average energy, peaks of energy, energy level, style, chords, volume, density of notes, number of notes, mean pitch, mean interval, highest pitch, lowest pitch, pitch variety, harmony duration, melody duration, interval duration, chord symbols, scales, chord extensions, relative roots, zone, type of instrument(s) and tune of the analyzed music data. Which of the above data the music data description of a particular piece of received music data actually contains may depend on the kind of music and the kind of instrument by which said music data is generated. Preferably, the music analyzer 23 is configured to analyze the received music data 4 continuously or at regular intervals, in particular at intervals of a length in the range from 10 msec to 10 seconds (preferably from 100 msec to 4 seconds) and at a distance in the range from 10 msec to 1 second (preferably from 100 msec to 500 msec), depending on the tempo. Methods for analysis of music data and for generating a music data description are generally known in the art and include the methods mentioned above.

In an embodiment the query generator 25 is configured to use, for generating a query 6, an accompaniment description 26 describing one or more preferences of a group of preferences comprising a tune to be improvised, one or more instruments to be improvised, one or more musicians to be improvised, a music style to be improvised and interactions between instruments. For instance, in an embodiment a user interface 29, as shown in FIG. 2, is provided allowing a user to enter one or more preferences of said accompaniment description 26. A user may, for instance, enter the preference that he/she wants to play with a drummer, e.g. a certain well-known drummer, and/or that a certain piece of music shall be played/improvised. Accordingly, this preference is included in the accompaniment description 26 and will then be used by the query generator 25 in the generation of the query 6 so that, in case a certain drummer has been entered by the user, the corresponding music database containing music patterns recorded by said drummer and/or comprising music patterns imitating the style of said particular drummer are stored is used for being queried.

To give another example, the accompaniment description may also contain a preference indicating interactions/influences between instruments. For instance, it may be defined in which sequence the instruments may play, in which sequence they may start/stop playing, under which conditions a certain instrument shall play louder or more quiet. Further, as an example, it may be defined that the drum should remain constant in a first part (or sequence), i.e. independent on any music descriptor extracted from other instruments, but later should be dependent on the energy level of the bass in a second part (or sequence).

In another embodiment the query generator 25 is configured to use, for generating said query 6, an accompaniment description 26 describing which parameter of said input music data 4 the accompaniment shall follow. For instance, it may be prescribed that the accompaniment shall follow the energy of a certain instrument playing the input music data 4. Other examples are that the bass should play "upward" or "downward" depending on the pitch range of, e.g., the guitar soloist, or dependent on the energy level of the drums, or that the piano should play more or less notes depending on the number of notes per second played by the (human) soloist.

As explained above, the preferences described by the accompaniment description 26 may be entered by a user through a user interface 29. In addition or as an alternative one or more preferences of said accompaniment description 26 may be generated automatically by use of an accompaniment description generator 31 which is also shown in dashed lines in FIG. 2. For instance, said accompaniment description generator 31 may be configured to decide automatically which instrument(s) fit(s) best with the input music data 4 and/or which style of the music should be improvised to best fit to the input music data 4.

As an alternative or in addition to the accompaniment description the query generator 26 uses, for generating a query 6, music rules describing one or more general rules of music 27 of a group of rules comprising preferred transitions, non-preferred transitions, harmonies, rules related to continuity, or rules related to the global energy level of the performance. Said music rules are preferably stored in a music rules database 30 and are generally predetermined (but may also be provided, at least in part, by the user). Said music rules may, for instance, comprise rules that prohibit certain transitions or define preferred harmonies or prohibited disharmonies. Preferably those music rules are defined per instrument, per musician and/or per music style, i.e. there may be various sub-databases of music rules available in the music rules database 30 which are accessed by the query generator 25 as needed in the particular situation.

In this context, i.e. in the context of music, a transition is generally understood as the middle section or formal function, while the main theme is the beginning, and the subordinate theme is the ending. It may traditionally be a part of the Sonata form's exposition in which the composer modulates from the key of the first subject to the key of the second, though many classical era works move straight from first to second subject groups without any transition.

Even further, in an embodiment a query generator may be configured to generate a query 6 per instrument to be improvised. This is depicted schematically in FIG. 4. In this embodiment it shall, as an example, be assumed that three different instruments shall be improvised, e.g. drums, bass and guitar, to accompany a musician who is live playing saxophone. The query generator 25' thus generates a different query 6a, 6b, 6c for each of the three different instruments to be improvised. The query interface 28' in this embodiment comprises three query sub-interfaces 28a, 28b, 28c each for processing and using one of said three queries 6a, 6b, 6c to query a different music database 5a (comprising music patterns for bass), 5b (comprising music patterns for guitar) and 5c (comprising music patterns for drums). In response three music patterns 7a, 7b, 7c for the different instruments to be improvised are received which are then output by the query interface 28' to the music output 22.

Figure 4:
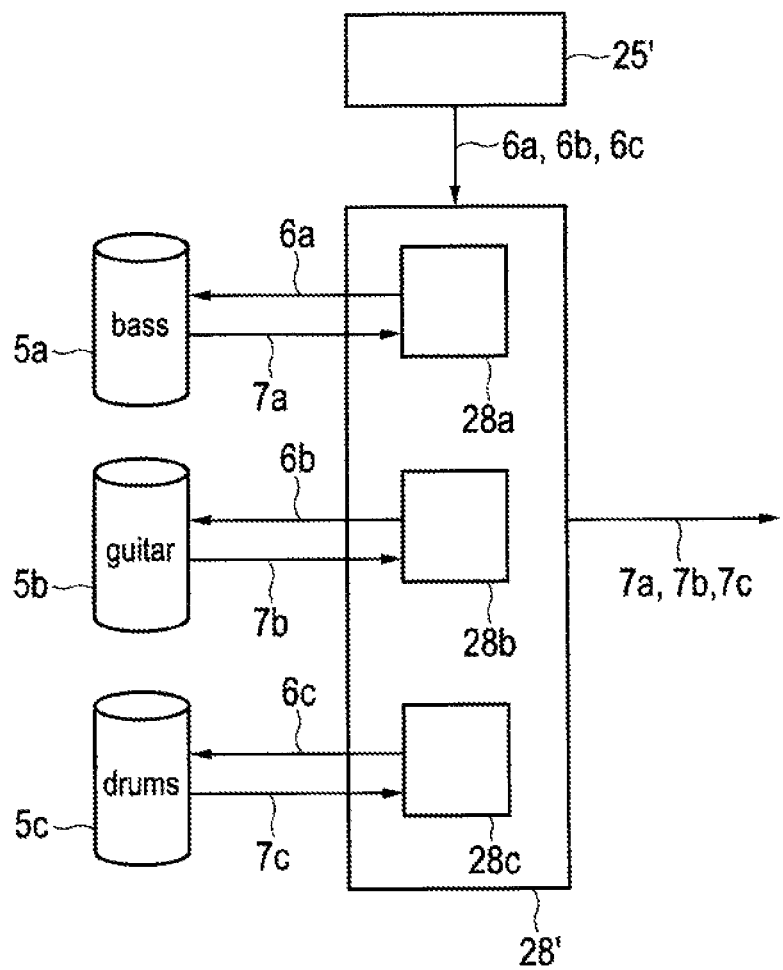
FIG. 4 shows a schematic diagram of an embodiment of a query generator and a query interface for use in a device for automatically generating music according to the present disclosure.

Of course, the embodiment shown in FIG. 4 is only to be understood as an example. There may be many more music databases available, e.g. for further instruments, different musicians, different styles of music, different tunes, etc. As explained above the music databases may be available for sale online or on a record carrier so that a user can decide which music database is useful for his/her purposes. For instance, an online store may offer a plurality of music databases, e.g. each including music from different musicians, interpretations over different pieces of music, different styles, etc. The user may select one music database, download and add it to an existing database and/or keep it as a separate database. In particular queries it may also be prescribed which particular music database shall be accessed by the query interface 28' wherein the query generator 25', of course, preferably knows which music databases are available for being queried.

In the above all the available information that is relevant for generating music as a real time accompaniment of input music data is generally used for generating the query, i.e. the music data description 24, the accompaniment description 26 and/or the music rules 27 are generally used to generate a certain query 6. Alternatively or in addition part or all of these data may be used in an optional check module 32 (see FIG. 2) to check if one or more received music patterns selected from the music database 5 fulfill all the prescribed criteria and/or to select the music pattern that best fulfills all prescribed criteria contained in the music data description 24, the accompaniment description 26 and/or the music rules 27. For instance, in an embodiment only the music data description 24 and the accompaniment description may be used for generating a query 6 which may result in the selection of three different music patterns 7. In the optional check module 32 the music rules 27 may then be used in addition for selecting the music pattern from among the three selected music patterns which best fulfills the music rules 27, which music patterns were then provided to the output unit 22.

Additionally or alternatively, in case more than one music pattern was returned in response to a query 6, the check module 32 may serve the purpose of randomly selecting one of the returned music patterns as the output music pattern. In other embodiments, the selection may be based on one or more additional music data description items (e. g. music data description items which were obtained from the input music by the music analyzer 23, but which were not used for the query).

Figure 5:
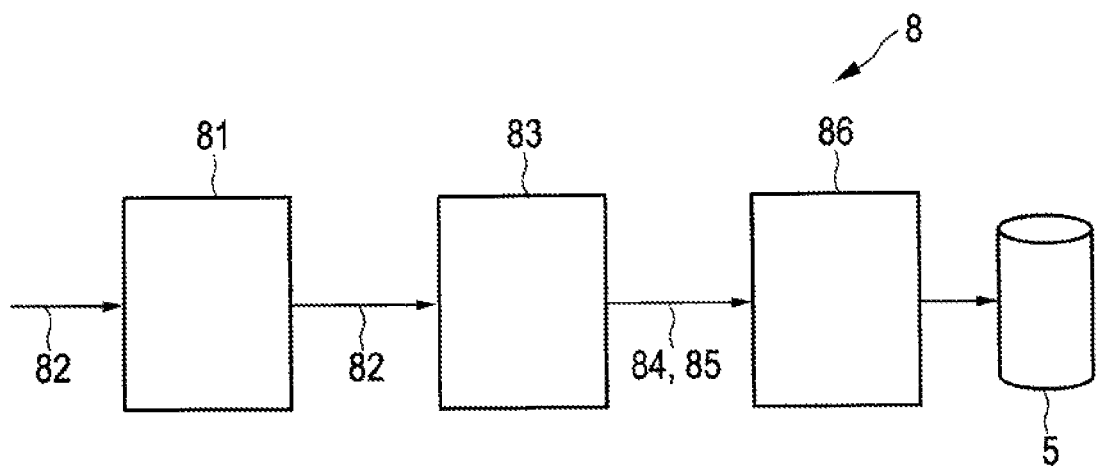
FIG. 5 shows a schematic diagram of an embodiment of a device for generating a music database.

FIG. 5 shows an embodiment of a device 8 according to the present disclosure for generating music data 82, in particular for use in the above described system and method according to the present disclosure for automatically generating music, particularly for automatically generating a real time accompaniment of input music data. This device 8 comprises a music input 81 for receiving music, in particular audio data, played live by a musician or recorded in advance from a musician. The received music data 82 is provided to a processing unit 83 which processes the music data 82 to generate the music patterns 84 and associated metadata 85 comprising one or more characteristics of said music patterns 84. Said music patterns 84 and the associated metadata 85 are then provided to the output interface 86 which records said music patterns 84 and the associated metadata 85 in the music database 5 which is then output, e.g. stored on a record carrier or stored on a server (for instance of an online shop for sale to users).

For generating a music database it is preferred that a musician plays and improvises many different tunes in different styles, different tempo, different energy, etc. to have as many different music data available which can be used for retrieving the music patterns and associated metadata so that the way of playing and improvising music of said musician is best represented by the data stored in a music database 5 for this particular musician. The available music data 82 are preferably segmented in the processing unit 83 into music patterns (i. e. short pieces of audio data), which is then analyzed to extract characteristic features of the music patterns. For that feature extraction known algorithms may be used, for instance an Extractor Discovery System (EDS) as described in Pachet, F. and Zils, A., "Automatic Extraction of Music Descriptors from Acoustic Signals", in X. Serra, editor, proceedings of ISMIR 2004, pages 353-356, Barcelona, Spain, 2004.

Thus, the same (or basically or partly the same) characteristic features may be extracted that are used for generating the music data description by the music analyzer 23 explained above (or rather, the same characteristic features are extracted by music analyzer 23 from the input music data that are extracted by processing unit 83 to describe the music patterns when database 5 is created). In particular, one or more of pitch, bar, key, tempo, distribution of energy, average energy, peaks of energy, energy level, style, chords, volume, density of notes, number of notes, mean pitch, mean interval, highest pitch, lowest pitch, pitch variety, harmony duration, melody duration, interval duration, chord symbols, scales, chord extensions, relative roots, zone, type of instrument(s) and tune of the input music data are extracted and stored as metadata along with the corresponding music patterns. The music patterns are generally little pieces of music having a time length in the range from 100 msec to a few seconds. Preferably, music transitions are of enormous interest and are primarily stored as music patterns along with corresponding metadata in a music database.

In the following, an example of a music database showing a database entry and example of a query are provided. An extract of a piano track database could be as follows:

| Bar index | Energy | Hit count | Tonality | Style |
|---|---|---|---|---|
| ... | ... | ... | ... | ... |
| 121 | 0.56 | 2 | C | Arpeggios |
| 122 | 0.12 | 2 | D | Legato chords |
| 123 | 0.26 | 4 | C | Arpeggios |
| 124 | 0.16 | 4 | C | Legato chords |
| 125 | 0.21 | 3 | C | Legato chords |
| 126 | 0.4 | 4 | C min | Arpeggios |
| ... | ... | ... | ... | ... |

It shall be supposed that the system needs a bar in the tonality of C (major) with low energy and with chords played legato. The corresponding query would be: SELECT (TONALITY=C; ENERGY <0.25; STYLE="LEGATO CHORDS"). The result could be: Bar 124 and Bar 125. The choice between bar 124 and bar 125 may be dependent on the previous bars played by the piano. For instance, if the piano played immediately before bar 122, then bar 124 will be preferred as the energy difference between 122 and 124 is 10.16-0.121=0.04 is less than the energy difference between 122 and 125, which is 10.21-0.121=0.09, and this maximizes continuity.

By the present disclosure an improved device and method for generating a music database for use in a device and method for automatically generating music, in particular for use in a device and method for automatically generating music as real time accompaniment of input music data are provided that enable reacting to the input music data and provide a better accompaniment than known systems and methods. With the music database generated according to the present disclosure it is particularly possible to provide a real-time analysis of input music and a real-time generation of accompaniments that are flexible and adaptive to the music played by a live musician so that, even if the live musician changes his or her style of music or any other relevant characteristics of the music he/she is currently playing, the system of the present disclosure reacts accordingly. It is not necessary to manually set many parameters, and the system and method of the present disclosure are not strictly following certain parameters set in advance by the user, but the method and system of the present invention provide a more optimal and natural accompaniment.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, define, in part, the scope of the foregoing claim terminology such that no inventive subject matter is dedicated to the public.

The present application claims the benefit of EU patent applications No. 12 170 706.1 filed in the EPO on Jun. 4, 2012 and No 12 194 679.2 filed in the EPO on Nov. 28, 2012, the entire contents of which being incorporated herein by reference.

It follows a list of further embodiments:

1. A device for automatically generating a real time accompaniment of input music data, said device comprising:
a music input that receives music data,
a music analyzer that analyzes received music data to obtain a music data description comprising one or more characteristics of the analyzed music data,
a query generator that generates a query to a music database comprising music patterns and associated metadata comprising one or more characteristics of said music patterns, said query being generated from said music data description and from an accompaniment description describing preferences of said real time accompaniment and/or music rules describing general rules of music,
a query interface that queries said music database using a generated query and that receives a music pattern selected from said music database by use of said query, and
a music output that outputs said received music pattern.

2. The device as defined in embodiment 1,
wherein said music analyzer is configured to obtain a music data description comprising one or more of one or more of bar, key, tempo, distribution of energy, average energy, peaks of energy, energy level, style, chords, volume, density of notes, number of notes, mean pitch, mean interval, highest pitch, lowest pitch, pitch variety, harmony duration, melody duration, interval duration, chord symbols, scales, chord extensions, relative roots, zone, type of instrument(s) and tune of analyzed music data.

3. The device as defined in any preceding embodiment,
wherein said music analyzer is configured to analyze received music data continuously.

4. The device as defined in embodiment 1 or 2,
wherein said music analyzer is configured to analyze received music data at regular intervals, in particular at intervals of a length in the range from 10 msec to 10 seconds and at a distance in the range from 10 msec to 1 second.

5. The device as defined in any preceding embodiment,
wherein said query generator is configured to use, for generating said query, an accompaniment description describing one or more preferences of a group of preferences comprising a tune to be improvised, one or more instruments to be improvised, one or more musicians to be improvised, a music style to be improvised and interactions between instruments.

6. The device as defined in any preceding embodiment, wherein said query generator is configured to use, for generating said query, an accompaniment description describing which parameter of said input music data the accompaniment shall follow.

7. The device as defined in any preceding embodiment, wherein said query generator is configured to use, for generating said query, music rules describing one or more general rules of music of a group of rules comprising preferred transitions, non-preferred transitions, harmonies, rules related to continuity, or rules related to the global energy level of the performance.

8. The device as defined in any preceding embodiment, wherein said query generator is configured to use, for generating said query, music rules per instrument, per musician and/or per music style.

9. The device as defined in any preceding embodiment, wherein said query generator is configured to generate a query (6a, 6b, 6c) per instrument to be improvised.

10. The device as defined in any preceding embodiment, further comprising a user interface allowing a user to enter one or more preferences of said accompaniment description.

11. The device as defined in any preceding embodiment, further comprising a accompaniment description generator that automatically generates one or more preferences of said accompaniment description from said input music data.

12. The device as defined in any preceding embodiment, further comprising a music rules database storing said music rules.

13. The device as defined in any preceding embodiment, further comprising a check module for checking one or more selected music pattern(s) versus the said music data description, said accompaniment description and/or said music rules.

14. A method for automatically generating a real time accompaniment of input music data, said method comprising:
  receiving music data,
  analyzing received music data to obtain a music data description comprising one or more characteristics of the analyzed music data,
  generating a query to a music database comprising music patterns and associated metadata comprising one or more characteristics of said music patterns, said query being generated from said music data description and from an accompaniment description describing preferences of said real time accompaniment and/or music rules describing general rules of music,
  querying said music database using a generated query,
  receiving a music pattern selected from said music database by use of said query, and
  outputting said received music pattern.

15. A computer program comprising program code means for causing a computer to perform the steps of said method as defined in embodiment 14 when said computer program is carried out on a computer.

16. A computer readable non-transitory medium having instructions stored thereon which, when carried out on a computer, cause the computer to perform the steps of the method as defined in embodiment 14.

17. A system for automatically generating a real time accompaniment of input music data, said system comprising:
  a device that automatically generates music as a real time accompaniment of input music data as defined in any one of embodiments 1 to 13 and
  a music database comprising music patterns and associated metadata comprising one or more characteristics of said music patterns, said music database being configured for being queried by said device by use of a query and for providing a music pattern selected from said music database by use of said query.

18. The system as defined in embodiment 17, further comprising a device that generates said music database.

19. The system as defined in embodiment 17 or 18, further comprising a cloud that includes at least one of the device that automatically generates music, said music database and said device that generates said music database.

20. A device for generating a music database for use in a device and method for automatically generating music, said device comprising:
  a music input that receives music data,
  a processing unit that segments said music data into music patterns and extracts a plurality of characteristics of a music pattern as metadata of said music pattern, said characteristics including at least chords, energy per beat and/or bar, density of notes and pitch of a music pattern,
  a music output that stores music patterns and associated metadata in a music database.

21. The device as defined in embodiment 20, wherein said processing unit is configured to extract as further characteristics one or more of bar, key, tempo, distribution of energy, average energy, peaks of energy, energy level, style, chords, volume, density of notes, number of notes, mean pitch, mean interval, highest pitch, lowest pitch, pitch variety, harmony duration, melody duration, interval duration, chord symbols, scales, chord extensions, relative roots, zone, type of instrument(s) and tune.

22. The device as defined in any preceding embodiment of embodiments 20 to 21, wherein said processing unit is configured to apply a feature extraction algorithm, in particular an Extractor Discovery System algorithm, for extracting of characteristics of a music pattern.

23. The device as defined in any preceding embodiment of embodiments 20 to 22, wherein said processing unit is configured to analyze received music data at regular intervals, in particular at intervals of a length in the range from 10 msec to 10 seconds and at a distance in the range from 1 msec to 1 second.

24. The device as defined in any preceding embodiment of embodiments 20 to 23, wherein said processing unit is configured to select transitions in said received music data, to use said transitions as music patterns and to extract a plurality of characteristics of a music pattern as metadata of said transitions.

25. A method for generating a music database for use in a device and method for automatically generating music, said method comprising:
  receiving music data,
  segmenting said music data into music patterns,
  extracting a plurality of characteristics of a music pattern as metadata of said music pattern, said characteristics including at least chords, energy per beat and/or bar, density of notes and pitch of a music pattern,
  storing music patterns and associated metadata in a music database.

26. A computer program comprising program code means for causing a computer to perform the steps of said method as defined in embodiment 25 when said computer program is carried out on a computer.

27. A computer readable non-transitory medium having instructions stored thereon which, when carried out on a computer, cause the computer to perform the steps of the method as defined in embodiment 25.

28. A music database comprising:
music patterns including segments of music segmented from music data, and
metadata comprising a plurality of characteristics of a music pattern, said characteristics including at least chords, energy per beat and/or bar, density of notes and pitch of a music pattern.

29. A music database as defined in embodiment 28, comprising music patterns obtained from music played by the same musician.

30. A music database as defined in embodiment 28, comprising music patterns obtained from music played by the different musicians.

31. A music database as defined in embodiment 28, comprising music patterns obtained from the same music tunes played by different musicians in one or more music styles.

32. A computer readable record carrier storing a music database as defined in embodiment 28.

33. Use of a music database as defined in embodiment 28 in a method or device for automatically generating music as a real time improvisation of input music data.

The invention claimed is:

1. A device for generating a music database for use in a device and method for automatically generating music, the device comprising circuitry configured to:
receive live music data in real-time via a microphone;
segment the music data into music patterns;
extract a plurality of characteristics of a music pattern as metadata of the music pattern, the characteristics including at least chords, energy per bar, density of notes, lowest pitch, and mean pitch of a music pattern;
select transitions in the received live music data, to (i) use the transitions as music patterns and (ii) extract a plurality of characteristics of a music pattern as metadata of the transitions; and
store the music patterns and associated metadata in the music database,
wherein the music database is configured to output real-time audio that is automatically generated based on the plurality of characteristics of the music patterns and the plurality of characteristics of the transitions associated with the live music data.

2. The device according to claim 1, wherein the circuitry is further configured to extract, as further characteristics, one or more of bar, key, tempo, distribution of energy, average energy, peaks of energy, energy level, style, chords, volume, density of notes, number of notes, mean interval, highest pitch, lowest pitch, pitch variety, harmony duration, melody duration, interval duration, chord symbols, scales, chord extensions, relative roots, zone, and type of instrument(s) and tune.

3. The device according to claim 1, wherein the circuitry is further configured to apply a feature extraction algorithm, in particular an Extractor Discovery System algorithm, for extracting characteristics of the music pattern.

4. The device according to claim 1, wherein the circuitry is further configured to analyze received music data at regular intervals, in particular at intervals of a length in the range from 10 msec to 10 seconds and at a distance in the range from 1 msec to 1 second.

5. The device according to claim 1, wherein the characteristics include number of notes.

6. The device according to claim 1, wherein the characteristics include highest pitch.

7. The device according to claim 1, wherein the characteristics include volume.

8. The device according to claim 1, wherein the characteristics include harmony duration.

9. The device according to claim 1, wherein the characteristics include melody duration.

10. The device according to claim 1, wherein the live music data includes saxophone data of a musician playing a saxophone.

11. The device according to claim 1, wherein the live music data includes guitar data of a musician playing a guitar.

12. A method for generating a music database for use in a device and method for automatically generating music, the method comprising:
receiving live music data in real-time via a microphone;
segmenting the music data into music patterns;
extracting a plurality of characteristics of a music pattern as metadata of the music pattern, the characteristics including at least chords, energy per bar, density of notes, lowest pitch, and mean pitch of a music pattern;
selecting transitions in the received live music data, to (i) use the transitions as music patterns and (ii) extract a plurality of characteristics of a music pattern as metadata of the transitions; and
storing the music patterns and associated metadata in the music database,
wherein the music database is configured to output real-time audio that is automatically generated based on the plurality of characteristics of the music patterns and the plurality of characteristics of the transitions associated with the live music data.

13. A non-transitory computer readable medium storing computer readable instructions thereon that, when executed by a computer, causes the computer to perform the method according to claim 12.

14. A music database comprising circuitry configured to:
store music patterns including segments of music segmented from live music data received in real-time via a microphone;
store metadata including a plurality of characteristics of a music pattern, the characteristics including at least chords, energy per bar, density of notes, lowest pitch, and mean pitch of a music pattern;
store metadata of transitions of music patterns, the transitions are selected from the received live music data and the transitions are used as music patterns, and the metadata includes a plurality of characteristics that are extracted from the music patterns; and
output real-time audio that is automatically generated based on the plurality of characteristics of the music patterns and the plurality of characteristics of the transitions associated with the live music data.

15. The music database according to claim 14, wherein the circuitry is further configured to store the music patterns obtained from music played by a same musician.

16. The music database according to claim 14, wherein the circuitry is further configured to store the music patterns obtained from music played by different musician.

17. The music database according to claim 14, wherein the circuitry is further configured to store the music patterns obtained from same music tunes played by different musicians in one or more music styles.

* * * * *